United States Patent
Carlson et al.

(10) Patent No.: US 8,484,276 B2
(45) Date of Patent: *Jul. 9, 2013

(54) PROCESSING ARRAY DATA ON SIMD MULTI-CORE PROCESSOR ARCHITECTURES

(75) Inventors: David G. Carlson, Rochester, MN (US); Travis M. Drucker, Rochester, MN (US); Timothy J. Mullins, Blaine, MN (US); Jeffrey S. McAllister, St. Paul, MN (US); Nelson Ramirez, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

This patent is subject to a terminal disclaimer.

(21) Appl. No.: 12/406,247

(22) Filed: Mar. 18, 2009

(65) Prior Publication Data

US 2010/0241824 A1 Sep. 23, 2010

(51) Int. Cl.
*G06F 15/76* (2006.01)
*G06F 9/06* (2006.01)

(52) U.S. Cl.
USPC ............... 708/403; 711/154; 712/1; 712/10; 712/11; 712/16

(58) Field of Classification Search
USPC .............................................. 708/403; 712/22
See application file for complete search history.

(56) References Cited

U.S. PATENT DOCUMENTS

| | | | |
|---|---|---|---|
| 5,815,421 A * | 9/1998 | Dulong et al. | 708/520 |
| 6,243,730 B1 | 6/2001 | Wang | |
| 6,530,010 B1 * | 3/2003 | Hung et al. | 712/1 |
| 6,625,721 B1 | 9/2003 | Chen | |
| 6,963,341 B1 | 11/2005 | Mimar | |
| 7,386,703 B2 | 6/2008 | Sandon et al. | |
| 7,937,567 B1 | 5/2011 | Nickolls et al. | |
| 2003/0084081 A1 | 5/2003 | Hanounik | |
| 2005/0125640 A1 * | 6/2005 | Ford et al. | 712/225 |
| 2005/0125641 A1 * | 6/2005 | Ford et al. | 712/225 |
| 2007/0106718 A1 | 5/2007 | Shum et al. | |
| 2007/0250683 A1 | 10/2007 | Van Hook et al. | |
| 2010/0023728 A1 | 1/2010 | El-Mahdy et al. | |
| 2010/0241824 A1 | 9/2010 | Carlson et al. | |
| 2011/0107060 A1 | 5/2011 | McAllister et al. | |

OTHER PUBLICATIONS

Takahashi, Daisuke "An Implementation of Parallel 1-D FFT Using SSE3 Instructions on Dual-Core Processors", Jun. 18, 2006, Applied Parallel Computing, State of the Art in Scientific Computing (Lecture Notes), Springer, Berlin, Heidelberg, pp. 1178-1187.

(Continued)

*Primary Examiner* — Shyue Jiunn Hwa
(74) *Attorney, Agent, or Firm* — Patterson & Sheridan LLP

(57) ABSTRACT

Techniques are disclosed for converting data into a format tailored for efficient multidimensional fast Fourier transforms (FFTS) on single instruction, multiple data (SIMD) multi-core processor architectures. The technique includes converting data from a multidimensional array stored in a conventional row-major order into SIMD format. Converted data in SIMD format consists of a sequence of blocks, where each block interleaves s rows such that SIMD vector processors may operate on s rows simultaneously. As a result, the converted data in SIMD format enables smaller-sized 1D FFTs to be optimized in SIMD multi-core processor architectures.

19 Claims, 6 Drawing Sheets

OTHER PUBLICATIONS

Takahashi, Daisuke et al: "An Implementation of Parallel 3-D FFT Using Short Vector SIMD Instructions on Clusters of PCs", Jan. 1, 2006, Applied Parallel Computing Lecture Notes in Computer Science, LNCS, Springer, Berlin, Germany, pp. 1159-1167.

International Search Report and Written Opinion of the International Searching Authority for the PCT filing of IBM.

Kumaki et al.: "Efficient Vertical/Horizontal-Space 1D-DCT Processing Based on Massive-Parallel Matrix-Processing Engine", IEEE International Symposium on Circuits and Systems; May 2007. New Orleans, LA,4 pages.

Franchetti, Franz et al.: "Discrete Fourier Transform on Multicore" IEEE Signal Processing Magazine, Nov. 2009, pp. 90-102.

Jun-Shan, Li et al.: Image Parallel Fourier Analysis Technology Based on LS MPPM (1): Principle, Analysis, and Design of Algorithm; Mini-Micro Systems Journal Paper, vol. 25, Jul. 2004, issue 7 pp. 1303-1306, abstract only.

* cited by examiner

PROCESSING ARRAY DATA ON SIMD MULTI-CORE PROCESSOR ARCHITECTURES

BACKGROUND OF THE INVENTION

1. Field of the Invention

Embodiments of the invention generally relate to performing efficient fast Fourier transforms (FFTS) on multi-core processor architectures. More specifically, embodiments of the invention relate to converting data into a format tailored for efficient FFTs on SIMD multi-core processor architectures.

2. Description of the Related Art

Some currently available processors support "single instruction, multiple data" (SIMD) extensions. SIMD indicates that a single instruction operates on multiple data items in parallel. For example, an "add" SIMD instruction may add eight 16-bit values in parallel. That is, the add operation (a single operation) is performed for eight distinct sets of data values (multiple data) in a single clock cycle. Typically, the data values may be supplied as elements of a vector. Accordingly, SIMD processing is also referred to as vector processing. SIMD instructions dramatically increase execution speed by performing multiple operations as part of a single instruction. Well known examples of SIMD extensions include multimedia extension ("MMX") instructions, SSE instructions, and vectored multimedia extension ("VMX") instructions.

Calculating FFTs efficiently on SIMD multicore processors is difficult. For large, one-dimensional FFTs (1D FFTs), a greater amount of parallelism may be obtained due to the larger groups of independent blocks of data processing. However, the 1D FFT is a fundamentally recursive algorithm with complexity O(N log N). Thus, for smaller-sized 1D FFTs, the amount of single-row parallelism is very small. Moreover, current libraries for performing FFTs are not tailored towards an FFT performed on a relatively smaller array of data (e.g., an FFT performed on an image size of 256×256 pixels, 512× 512 pixels, or 1024×1024 pixels). Although a degree of SIMD parallelism is extracted from the 1D FFT at larger sizes, only a small amount of intra-row algorithm parallelism is extracted at smaller sizes. Furthermore, current libraries for multi-core FFTs are standalone and do not allow the functional pipelining of work required for compute-operation-to-input/output (IO) optimization.

SUMMARY OF THE INVENTION

One embodiment of the invention includes a method for generating a SIMD data structure tailored for processing fast Fourier transforms (FFTS) on a SIMD multi-core processor architecture. The method may generally include receiving input data, wherein the input data is a matrix having m rows and n columns; converting the input data into a SIMD format to produce converted data for simultaneous processing of s rows of the input data, wherein the converted data includes a sequence of blocks, wherein each block includes s consecutive rows of the input data that are interleaved such that first elements of the s consecutive rows precede any second elements of the s consecutive rows in terms of sequential memory addresses to produce s interleaved rows; and storing the converted data in sequential memory addresses.

Another embodiment of the invention includes a computer-readable storage medium containing a program which, when executed, performs an operation for generating a SIMD data structure tailored for processing fast Fourier transforms (FFTS) on a SIMD multi-core processor architecture. The operation may generally include receiving input data, wherein the input data is a matrix having m rows and n columns; converting the input data into a SIMD format to produce converted data for simultaneous processing of s rows of the input data, wherein the converted data includes a sequence of blocks, wherein each block includes s consecutive rows of the input data that are interleaved such that first elements of the s consecutive rows precede any second elements of the s consecutive rows in terms of sequential memory addresses to produce s interleaved rows; and storing the converted data in sequential memory addresses.

Still another embodiment of the invention includes a system having a processor and a memory containing a program, which when executed by the processor is configured to perform an operation for generating a SIMD data structure tailored for processing fast Fourier transforms (FFTS) on a SIMD multi-core processor architecture. The operation should generally include receiving input data, wherein the input data is a matrix having m rows and n columns; converting the input data into a SIMD format to produce converted data for simultaneous processing of s rows of the input data, wherein the converted data includes a sequence of blocks, wherein each block includes s consecutive rows of the input data that are interleaved such that first elements of the s consecutive rows precede any second elements of the s consecutive rows in terms of sequential memory addresses to produce s interleaved rows; and storing the converted data in sequential memory addresses.

Yet another embodiment of the invention includes a method for generating a SIMD data structure tailored for processing fast Fourier transforms (FFTS) on a SIMD multi-core processor architecture. The method may generally include receiving input data, wherein the input data is a matrix having m rows and n columns, wherein the matrix includes b blocks, and wherein each block includes s consecutive rows; and copying the b blocks into sequential memory addresses, wherein copying a block comprises copying, into sequential memory addresses, first elements of the s consecutive rows of the block, followed by second elements of the s consecutive rows of the block, followed by remaining elements of the s consecutive rows in a similar manner, ending with last elements of the s consecutive rows of the block.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
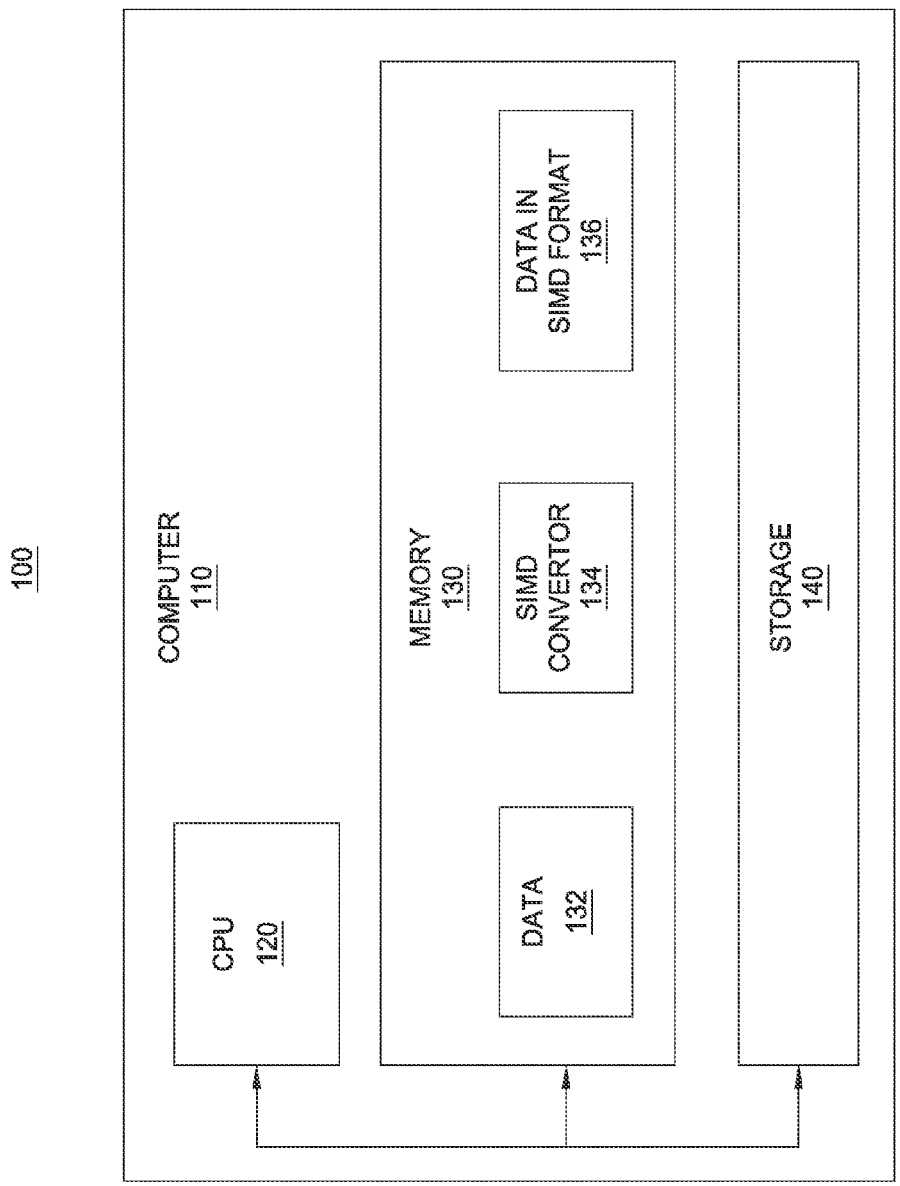
FIG. 1 illustrates a SIMD convertor running in a computing environment, according to one embodiment of the invention.

Embodiments of the invention provide techniques for converting data into a format tailored for efficient multidimensional FFTs on SIMD multi-core processor architectures. One embodiment provides a technique for converting data from a multidimensional array stored in row-major order into a SIMD format. Converted data in SIMD format may include of a sequence of blocks, where each block interleaves data from a number of rows (s rows) such that SIMD vector processors may operate on s rows simultaneously. That is, each single vector instruction processes s row elements (one from each row) at a time. As a result, smaller-sized 1D FFTs are optimized in multi-core limited-memory processors. Examples of smaller-sized 1D FFTs include 256×256, 512× 512 and 1024×1024. That is, n-way SIMD in parallel cores is utilized at a multiple-1D-FFT level.

To increase single-row parallelism for smaller-sized 1D FFTs, embodiments of the invention provide a SIMD data structure configured to use the potential of a SIMD vector instruction to simultaneously process multiple floating point values. For example, a Cell BE processor that may simultaneously process four single precision floating point values in a single SIMD vector instruction. The SIMD data structure may be tailored for processing FFTs on such SIMD multi-core processors. Additionally, in one embodiment, the FFT algorithm may be optimized for use with the SIMD data structure. Furthermore, operations necessary for higher-dimensional FFTs may be built using this data structure.

For example, in the particular field of image processing, image data is commonly stored as a two-dimensional array. Further, data in the two-dimensional array is typically stored in a conventional row-major order (such as is used by the C programming language). Applications that operate on the image data, such as an image viewer, typically expect the image data to be stored in a row-major order.

Embodiments of the invention provide a data structure and algorithm allowing smaller-sized FFTs (such as image data in a 256×256, 512×512 or 1024×1024 sized image) to be efficiently processed on SIMD multi-core processor architectures. A mechanism is specified that converts data stored in a conventional row-major order to a SIMD data format tailored for multi-row SIMD 1D FFT algorithms. To use the SIMD data format, the FFT algorithm may be modified to perform a standard radix-2 or radix-4 algorithm (or combinations of other radix(n) FFT algorithms) on s rows and/or columns at a time (for example, s=4). The number of rows or columns that can be processed using a single instruction corresponds to the number of floating point data elements that can fit on the SIMD registers of a processor. For 128-bit SIMD registers, s=4, i.e., 4 single precision floating points may be placed in register.

Further, standard 1D FFT algorithms may be modified to use vector operations and the SIMD data structure. A 1D FFT algorithm so modified enables multiple rows or multiple columns to be processed simultaneously. In other words, techniques disclosed herein exploit multi-1D-FFT parallelism by using SIMD operations to process multiple 1D FFTs at a time. For example, a SIMD 1D FFT may operate directly on the SIMD data structure, processing multiple rows (e.g., 4 rows) per vector operation. As a result, the amount of data transferred per compute operation is increased. Furthermore, the functional pipelining of other operations (in addition to the FFT to be performed on the input data) becomes possible. For smaller-sized FFTs, the compute-operation-to-IO ratio is increased, which is particularly important for medical imaging applications (e.g., 256×256, 512×512, and 1024×1024 FFTS).

As stated, techniques disclosed herein convert data (such as an image) already in a conventional row-major order (such as is used by the C programming language) into a SIMD data format for direct processing by SIMD processing elements. Further, after vector multi-row FFT code processes the data in groups of s rows at a time (such as s=4 for 128-bit SIMD registers), the data may then be converted back to the conventional row-major order for viewing and/or further processing by typical applications which expect to receive the data in the row-major order.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a SIMD convertor 134 running in a computing environment 100, according to one embodiment of the invention. As shown, the computing environment 100 includes computer 110. In one embodiment, the computer system illustrated in computing environment 100 may include existing computer systems, e.g., a desktop computer, a server computer, a laptop computer, a tablet computer, and the like. The computing environment 100 illustrated in FIG. 1, however, is merely an example of one computing environment. Embodiments of the present invention may be adapted for use with other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language and may be adapted to take advantage of new computing systems as they become available.

As shown, the computer 110 includes a central processing unit (CPU) 120 which obtains instructions and data from a memory 130 and a storage 140. The CPU 120 is a programmable logic device that performs all the instruction, logic, and mathematical processing in a computer. For purposes of this description, the CPU 120 is presumed to support some SIMD extensions (e.g., include multimedia extension ("MMX") instructions, SSE instructions, or vectored multimedia extension ("VMX") instructions.) The storage 140 stores application programs and data for use by the computer 110. In one embodiment, the storage system illustrated in computing environment 100 may include existing storage systems, e.g., hard-disk drives, flash memory devices, optical media, and the like. As shown, the memory 130 includes data 132, a SIMD convertor 134, data in SIMD format 136, and an operating system (not shown). An operating system is the software used for managing the operation of computer 110. Examples of operating systems include UNIX, a version of the Microsoft Windows® operating system, and distributions of the Linux® operating system. (Note: Linux is a trademark of Linus Torvalds in the United States and other countries.)

In one embodiment, the SIMD convertor 134 receives the data 132. As described in greater detail below, the SIMD convertor 134 is configured to convert the data 132 into SIMD format to produce data in SIMD format 136.

Figure 2:
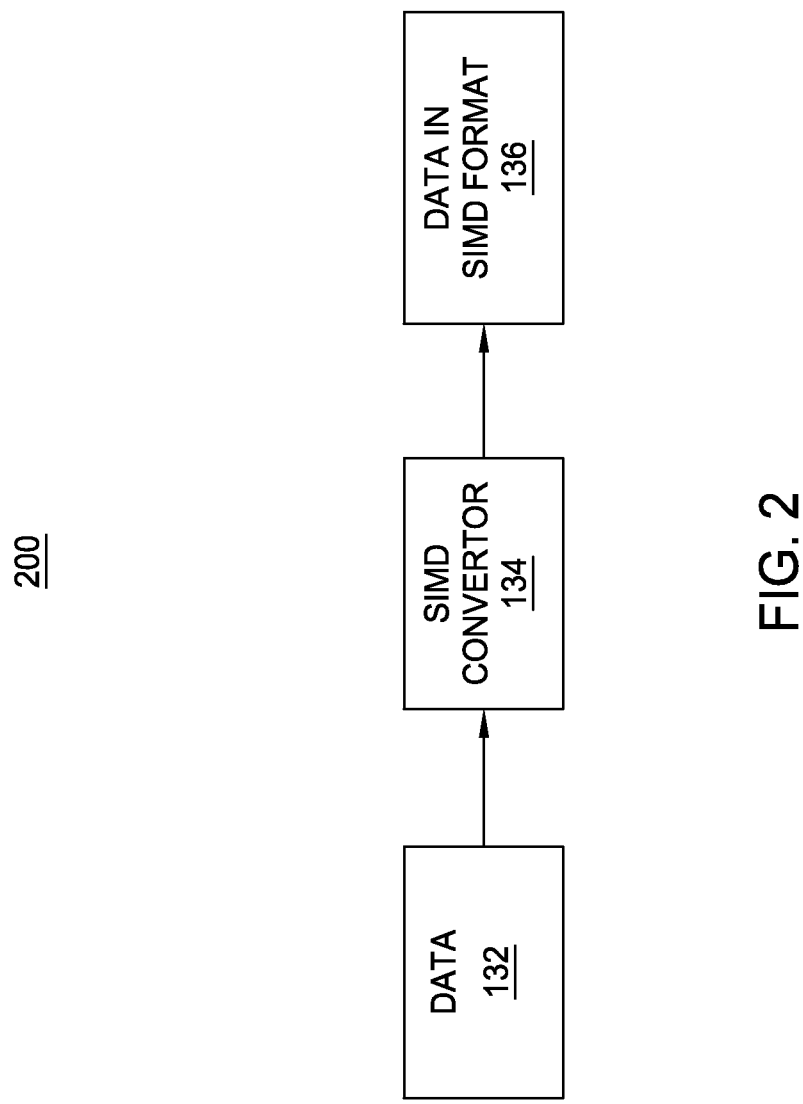
FIG. 2 illustrates a data flow of the SIMD convertor, according to one embodiment of the invention.

FIG. 2 shows a data flow 200 for the SIMD convertor 134, according to one embodiment of the invention. Illustratively, the data flow 200 includes the data 132. Data 132 may represent two-dimensional array data, such as images. Typically, the data 132 may be logically represented as a two-dimensional array. Further, the data 132 may be stored as a file in the storage 140. Elements of the two-dimensional array may be stored in any conventional order, such as row-major order (i.e., the rows are stored in sequence) or column-major order (i.e., the columns are stored in sequence). To illustrate, assume that the two-dimensional data is a 4×4 matrix with the following values:

TABLE I

| Two-dimensional data example | | | |
| --- | --- | --- | --- |
| 0 | 1 | 2 | 3 |
| 4 | 5 | 6 | 7 |
| 8 | 9 | 10 | 11 |
| 12 | 13 | 14 | 15 |

Such a 4×4 matrix may be represented as a two-dimensional array. Source code syntax like the following may be used to declare the two-dimensional array:

TABLE II

| Array declaration example - C source code |
| --- |
| int data[4][4] = {{0, 1, 2, 3}, {4, 5, 6, 7}, {8, 9, 10, 11}, {12, 13, 14, 15}}; |

Because the C programming language uses a row-major order, based on the above declaration, the elements are stored in the memory 130 at sequential memory addresses, as follows:

TABLE III

| Row-major order example | | | | | | | | | | | | | | | |
| --- | --- | --- | --- | --- | --- | --- | --- | --- | --- | --- | --- | --- | --- | --- | --- |
| 0 | 1 | 2 | 3 | 4 | 5 | 6 | 7 | 8 | 9 | 10 | 11 | 12 | 13 | 14 | 15 |

Alternatively, the 4×4 matrix may be represented as a two-dimensional array that uses a column-major order. An example of a programming language that uses a column-major order is FORTRAN. In this case, the elements are stored in the memory 130 at sequential memory addresses, as follows:

TABLE IV

Column-major order example

| 0 | 4 | 8 | 12 | 1 | 5 | 9 | 13 | 2 | 6 | 10 | 14 | 3 | 7 | 11 | 15 |

In one embodiment, the SIMD convertor 134 converts data into a sequence of blocks, where each block represents s rows of data. Then, s rows of data may be processed simultaneously using SIMD operations. The number of blocks may be represented by b. If m represents the number of rows of the two-dimensional data, then the number of blocks, b, may be calculated by the equation b=m/s. For example, if each block represents two rows of data (i.e., s=2), then the 4×4 matrix (i.e., m=4) includes (4/2=2) two blocks. Block 1 includes the first two rows (i.e., the rows containing the values 0 1 2 3 and 4 5 6 7) and block 2 includes the last two rows (i.e., the rows containing the values 8 9 10 11 and 12 13 14 15). The SIMD convertor places the blocks in memory sequentially one after another. However, within each block, the SIMD convertor interleaves the elements of each row, such that all of the first elements of the rows precede any of the second elements of the rows (in terms of sequential memory addresses). For example, block 1 consists of a row containing values 0 1 2 3 and a row containing values 4 5 6 7. In one embodiment, the SIMD convertor 134 interleaves the elements such that all of the first elements of the rows, namely the values 0 and 4, come before any of the second elements of the rows, namely the values 1 and 5. Similarly, all of the second elements of the rows, namely the values 1 and 5, precede any of the third elements of the rows (in terms of sequential memory addresses), namely the values 2 and 6, and so forth. Illustratively, the two-dimensional data in the previous examples will be converted to SIMD format. Elements of data in SIMD format are stored in memory 130 at sequential memory addresses, as follows:

TABLE V

SIMD format example

| 0 | 4 | 1 | 5 | 2 | 6 | 3 | 7 | 8 | 12 | 9 | 13 | 10 | 14 | 11 | 15 |

As shown, the two-dimensional data in SIMD format is represented as a sequence of two blocks, with each block representing two rows of data (s=2). Within each block, data from the two rows of data is interleaved such that all of the first elements of the two rows come before any of the second elements of the two rows, and so forth for all of the elements. To generalize, in the SIMD format, all of the ith elements of the rows in the block come before any of the (i+1)th elements of the rows in the block. Each element may be of any data type such as an integer, a double, or a float. Further, each element may also be a complex number, e.g., a complex number that is represented by two 16-bit floats stored sequentially in memory. Complex numbers may also be represented as two arrays: a first array for real parts of the complex numbers and a second array for imaginary parts of the complex numbers.

Once in SIMD format, the two-dimensional data is tailored for simultaneous processing of s rows of the input data at a time. Specifically, each SIMD instruction may process one element from each of the s rows, for a total of s elements being processed in a single SIMD instruction. Consequently, the SIMD format is tailored for multi-row SIMD 1D FFT algorithms because the SIMD format allows the algorithms (once modified to work with the SIMD format) to exploit row parallelism during computation. Row-parallelism may be exploited because of a precise way in which data in the SIMD format is arranged in memory.

Figure 3:
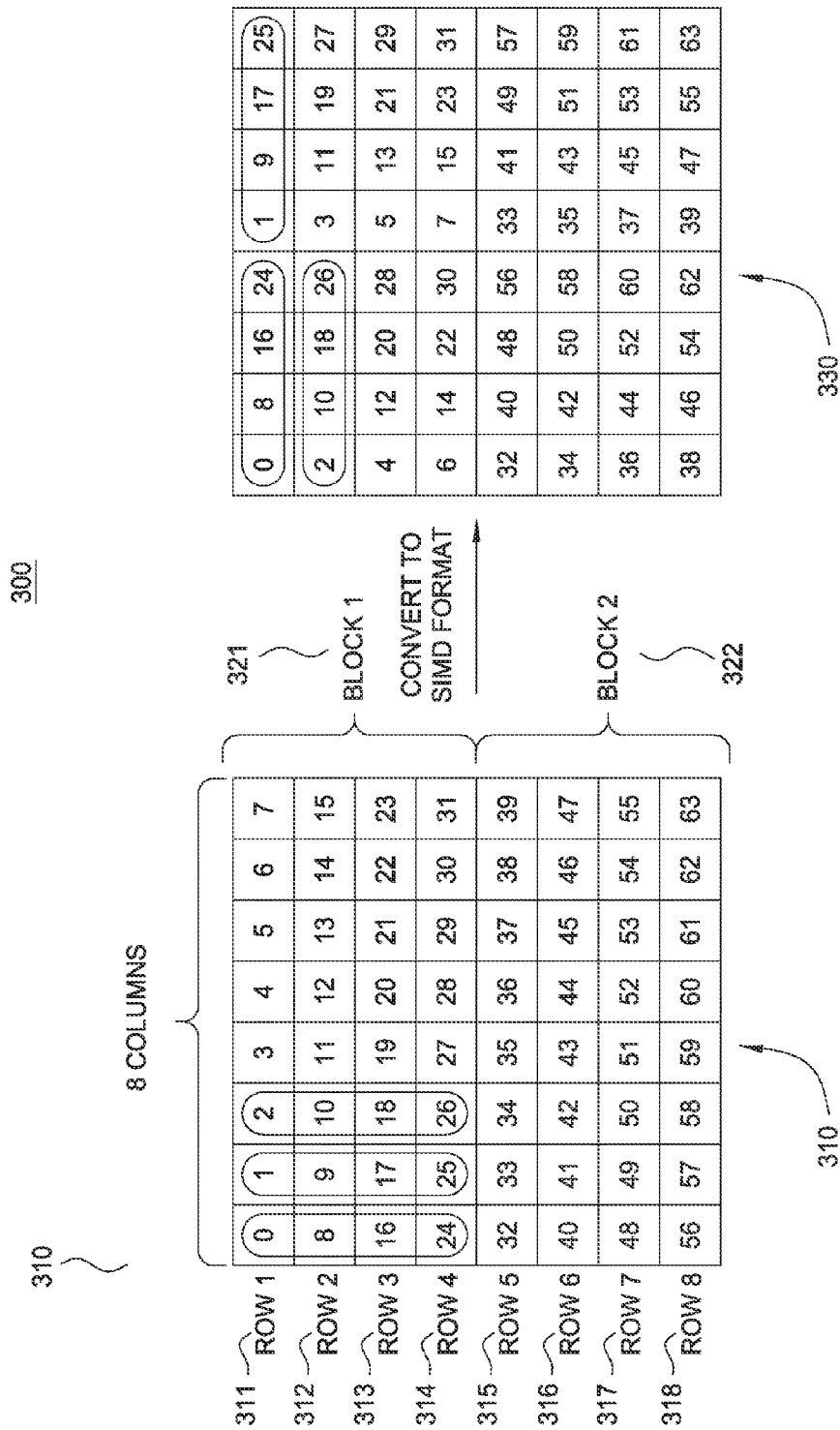
FIG. 3 illustrates a logical view of data being converted into a SIMD format, according to one embodiment of the invention.

FIG. 3 illustrates a view 300 of data 132 being converted into SIMD format 136 by the SIMD convertor 134, according to one embodiment of the invention. In this example, m=8 and s=4. That is, the data 132 consists of 8 rows (m=8), and the SIMD convertor 134 is converting the data 132 into a sequence of blocks, such that each block represents 4 rows (s=4) to be processed simultaneously by SIMD operations following conversion. The number of blocks, b, is 2 (i.e., using the equation b=m/s yields 8/4=2).

As shown, logical view 300 includes data 310 and data in SIMD format 330. The data 310 is a particular example of the data 132 of FIG. 1. Similarly, the data in SIMD format 330 is a particular example of the data in SIMD format 136 of FIG. 1. As shown, data 310 is an 8×8 matrix consisting of eight columns and eight rows. The eight rows include a first row 311, a second row 312, a third row 313, a fourth row 314, a fifth row 315, a sixth row 316, a seventh row 317, and an eighth row 318. The data 310 also includes two blocks (i.e., b=2 from above). A first block 321 includes the first four rows, while a second block 322 includes the last four rows.

In one embodiment, the SIMD convertor 134 generates data in SIMD format 330 from data 310. As shown, while ordering of the blocks 321, 322 is retained in the data in SIMD format 330, data in the rows of each block has been interleaved such that all of the ith elements of the rows in each block come before any of the (i+1)th elements of the rows in each block. Illustratively, the values 0 8 16 24 (i.e., the first elements of the rows in the first block 321) come before the values 1 9 17 25 (i.e., the second elements of the rows in the first block 321). Similarly, the values 1 9 17 25 (i.e., the second elements of the rows in the first block 321) come before the values 2 10 18 26 (i.e., the third elements of the rows in the first block 321), and so forth for the rest of the elements. Further, the last element of a row (such as the value 25 of the first row) and the first element of the next row (such as the value 2 of the second row) may be stored sequentially in memory.

Figure 4:
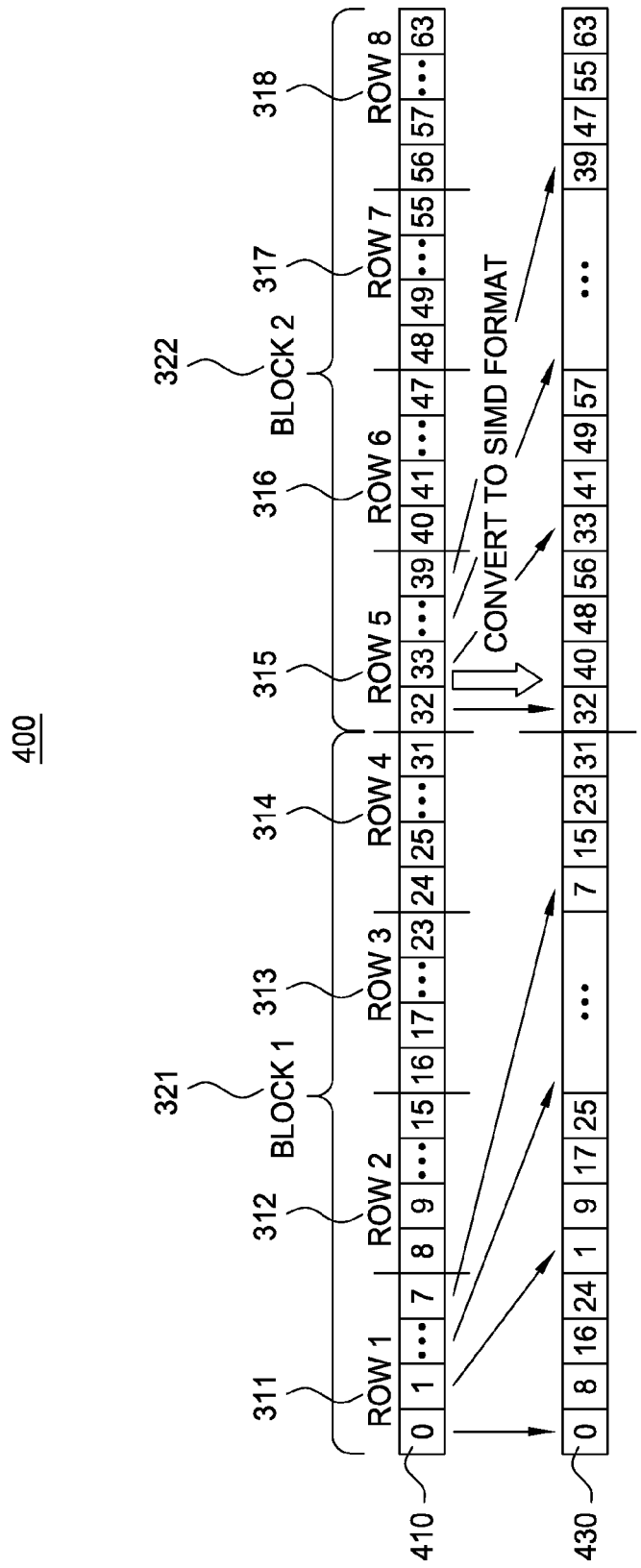
FIG. 4 illustrates a physical view of data being converted into SIMD format, according to one embodiment of the invention.

FIG. 4 illustrates a view 400 of data being converted into SIMD format that corresponds to the logical view of FIG. 3, according to one embodiment of the invention. As shown, physical view 400 includes data 410 and data in SIMD format 430. The data 410 corresponds to the data 310 of FIG. 3. Similarly, the data in SIMD format 430 corresponds to the data 330 of FIG. 3. That is, the data 410 and the data in SIMD format 430 represent how the data shown in the arrays of FIG. 3 are stored in memory. Illustratively, the data 410 and the data in SIMD format 430 are shown as two-dimensional arrays. In this example, it is assumed that the two-dimensional arrays represent sequential addresses in memory where each address stores a value of the two-dimensional arrays.

As shown, the data 410 includes the first row 311, the second row 312, the third row 313, the fourth row 314, the fifth row 315, the sixth row 316, the seventh row 317, and the eighth row 318. The data 310 also consists of two blocks. The first block 321 consists of the first four rows, while the second block consists of the last four rows. The rows of data 410 and the rows of data in SIMD format 430 are stored linearly in memory. That is, if a row has n elements, and the nth element of the first row is found at the (n−1)th position of an array, then the first element of the second row may be found at the nth position of the array, and so forth for each of the rows.

Figure 5:
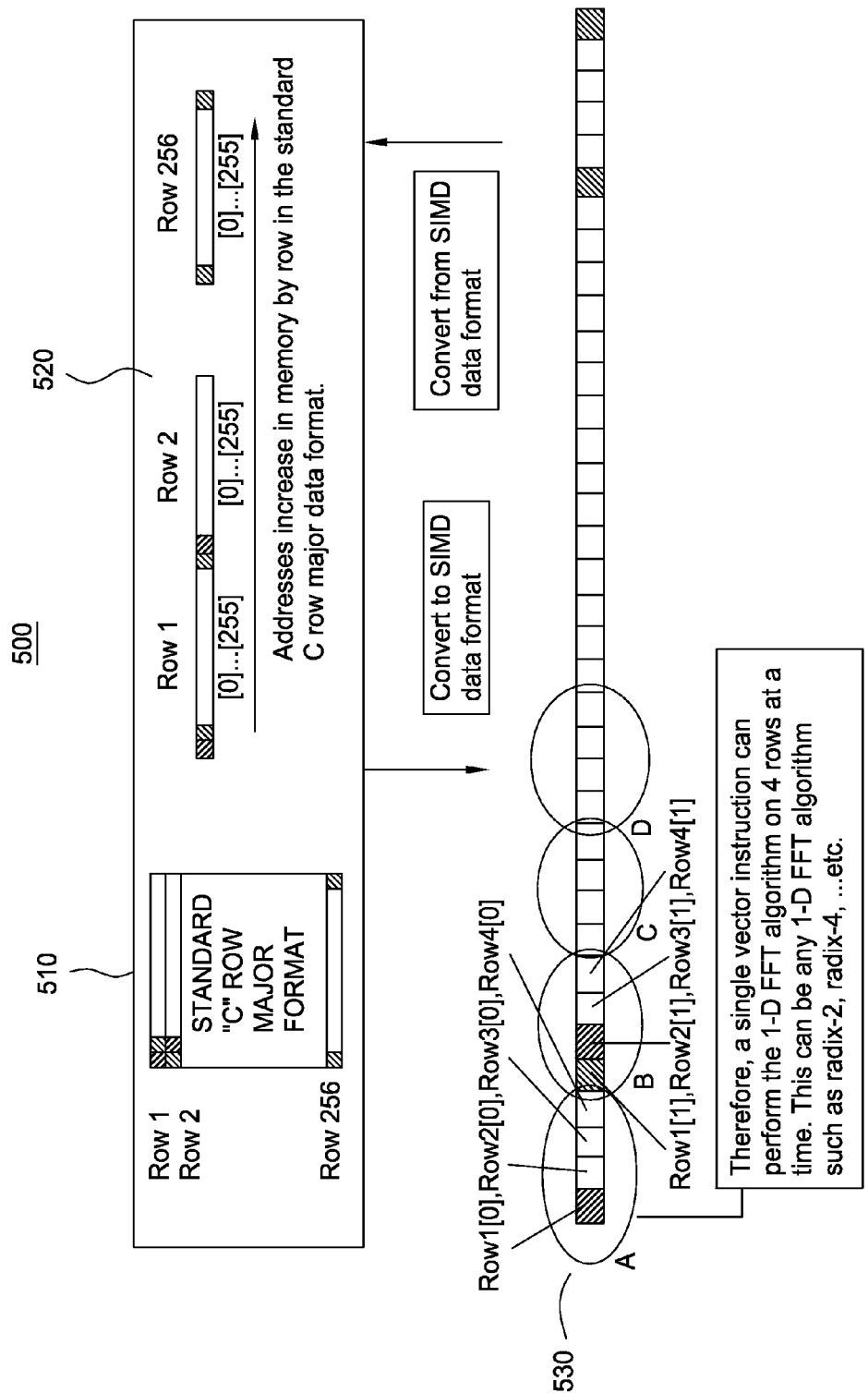
FIG. 5 illustrates data being converted into SIMD format for data of an arbitrary size, according to one embodiment of the invention.

FIG. 5 is a generalized view 500 of data 510, 520 being converted into SIMD format for data of an arbitrary size, according to one embodiment of the invention. As shown, the view 500 includes a first view 510 of the data, a second view 520 of the data, and a third view 530 of the data in SIMD format. In this example, the data array is of a size of 256 rows and 256 columns. Specifically, m=256, s=4, and b=256/4=64. Put another way, the data consists of 256 rows (m=256), and the SIMD convertor 134 is converting the data into a sequence of blocks, such that each block represents 4 rows (s=4) to be processed simultaneously by SIMD operations following conversion. The number of blocks, b, is 64 (i.e., using the equation b=m/s as given above).

In one embodiment, the SIMD convertor 134 converts data 132 into SIMD format to create data in SIMD format 136 in the following manner. First, assume that the data is a matrix having m rows and n columns. Next, assume an objective of simultaneous processing of s rows of data at a time using SIMD operations. Then, the SIMD convertor 134 divides the matrix into b blocks, with b given by the equation b=m/s. Each block contains s consecutive rows of the matrix. The SIMD convertor 134 arranges the b blocks sequentially in linear memory. Finally, the SIMD convertor 134 interleaves s consecutive rows of each block, such that all of the ith elements of the s consecutive rows are stored before any of the (i+1)th elements of the s consecutive rows, where the value of i ranges from 0 to n.

Once the data in SIMD format 136 is created, a single SIMD vector instruction may perform a one-dimensional FFT algorithm on s rows at a time. The one-dimensional FFT algorithm may be any algorithm such as radix-2, radix-4, etc. In one embodiment, to use the data in SIMD format 136, an algorithm may be modified by replacing array indices to data in scalar format 310 with new array indices to data in SIMD format 330. Referring again to FIG. 3, suppose an algorithm accesses the value "3" of the data in scalar format 310 by referencing the fourth element of the first row. To use the data in SIMD format 330, the algorithm may be modified to reference the fifth element of the second row of data in SIMD format 330. A single vector instruction may then simultaneously process values "3", "11", "19", and "27". Such modifications may be made by a programmer or by a tool such as a compiler.

Figure 6:
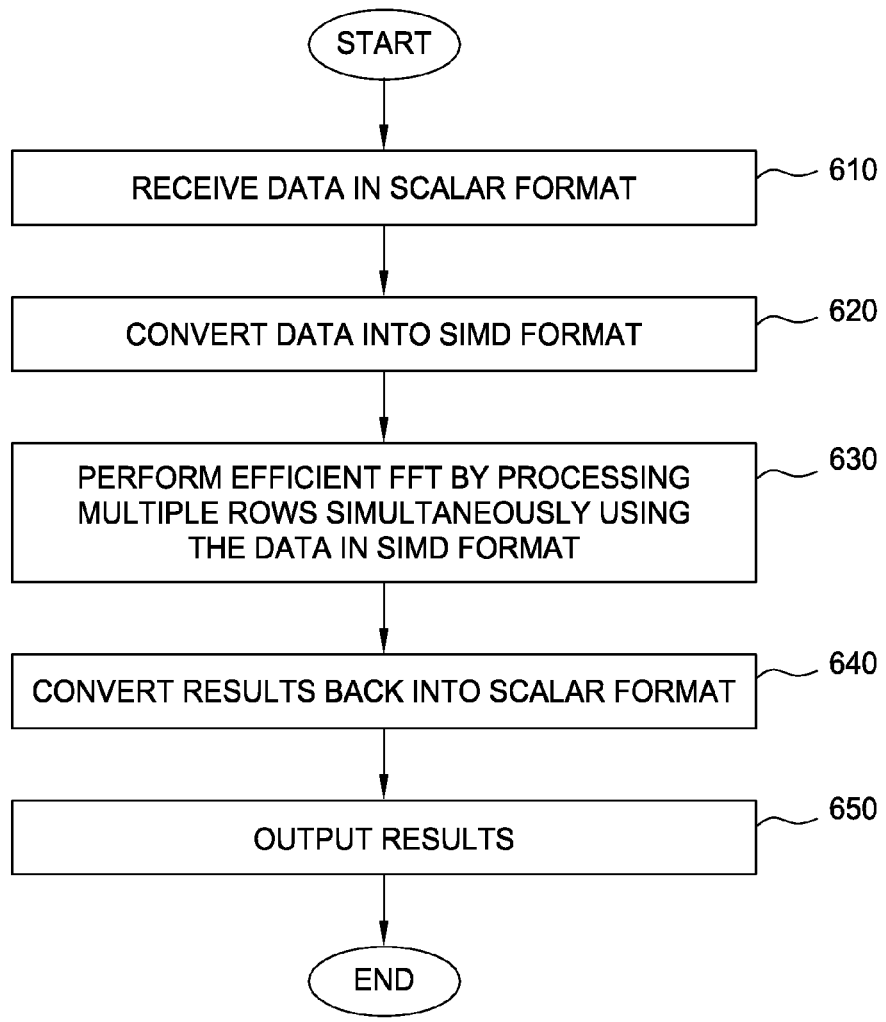
FIG. 6 illustrates a method for performing FFTs on SIMD multi-core processor architectures, according to one embodiment of the invention.

FIG. 6 is a flow diagram that illustrates a method 600 for performing efficient FFTs on a SIMD multi-core processor architecture, according to one embodiment of the invention. As shown, the method 600 begins at step 610, where the SIMD convertor 134 receives data 132 in scalar format. Scalar format refers to any conventional format that does not readily lend itself to simultaneous processing of multiple rows of data. Examples of scalar format include row-major order and column-major order, as previously described. For example, the SIMD convertor 134 may receive data in the form of a 256×256 matrix, where the elements of the matrix are stored in row-major order. At step 620, the SIMD convertor 134 converts the data into SIMD format to produce data in SIMD format 136. For example, data from the 256×256 matrix is converted into 64 sequential blocks, where each block consists of four consecutive rows interleaved such that the first elements of the four consecutive rows precede the second elements of the four consecutive rows (in terms of sequential memory addresses), the second elements precede the third elements, and so forth.

At step 630, an FFT is performed by processing four rows simultaneously using the data in SIMD format 136. For example, a radix-2 algorithm may be performed that utilizes SIMD vector operations that process four floating-point values at a time. In one embodiment, the FFT algorithm may be optimized for SIMD processing. At step 640, the SIMD convertor 134 converts the results back into a scalar format. For example, the SIMD convertor 134 converts the results from performing the radix-2 algorithm into row-major order. In the example of image data, such a conversion is for other applications (such as an image viewer) that expect images in row-major format. Details of the conversion are more fully set forth below. At step 650, the results are output. After step 650, method 600 terminates. In the following, although reference is made to pseudocode that converts two-dimensional arrays of complex numbers into SIMD format, other data types, such as doubles, floats, and integers, may be supported by embodiments of the invention. Below is a sample pseudo-code for performing the conversion from row-major order to SIMD format corresponding to the forward conversion in step 620 of FIG. 6, according to one embodiment of the invention. The function parameter fp_data is a file pointer to an input data file structured in row-major format. And the function parameter dataReal and dataImag are a reference to output data results.

TABLE VI

Converting from row-major order to SIMD format - C++ source code

```
1   int convertfromC2SIMD(FILE * fp_data, float* dataReal, float * dataImag,
2       int cols, int rows, int z) {
3   int numsimd = 4;// e.g. 128 bit register @ 4 byte single precision floating point
4   int fullusedblocks = rows / numsimd; // e.g. 256/4 = 64 blocks (1 block = 4 rows)
5   float* tempRealFloatPtr = dataReal;   // working pointers
6   float * tempImagFloatPtr = dataImag;// working pointers
7   for (int k = 0; k < z; k++) {        // loop through all images
8       // Fill full used blocks
9       // m indicates the block number, where a block consists of 4 rows
10      for (int m = 0; m < fullusedblocks; m++) {// increment row index by numsimd(4)
11          // Fill in a block with data
12          for (int j = 0; j < numsimd; j++) {
13              for (int i = j; i < numsimd * cols; i = i + numsimd) {
14                  fread(&(tempRealFloatPtr[i]), sizeof(float), 1, fp_data);
15                  fread(&(tempImagFloatPtr[i]), sizeof(float), 1, fp_data);
16              }
```

TABLE VI-continued

Converting from row-major order to SIMD format - C++ source code

```
17        }
18        // Pointer must be increased by size of 4 rows to fill each block
19        // Since each block consists of 4 rows.
20        // The size of a row is indicated by the number of columns
21        // move pointer by 4 rows
22        tempRealFloatPtr = tempRealFloatPtr + (numsimd * cols);
23        // move pointer by 4 rows
24        tempImagFloatPtr = tempImagFloatPtr + (numsimd * cols);
25     } // end processing a block
26 } // end images loop
27 return 0;
28 } // end convert2simd function
```

At line 1, a function convertfromC2SIMD is defined. The function definition includes a formal parameter fp_data of type FILE *, which represents a file containing input data stored in row-major order. The function definition also includes formal parameters dataReal and dataImag of type float * which represent output pointers for real and imaginary parts of complex numbers, respectively. At line 2, the function definition includes the following additional formal parameters: cols of type int representing the number of columns of the input data, rows of type int representing the number of rows of the input data, and z of type int representing the number of images to convert. For example, in the field of medical imaging, z may represent the number of horizontal image slices of a magnetic resonance imaging (MRI) scan of a human cranium. At line 3, an int numsimd is defined to be 4, meaning that four rows of data of are to be processed simultaneously by SIMD operations. Put another way, four consecutive rows of data are stored in each block of the data in SIMD format.

At line 4, an int fullusedblocks is defined to be rows/numsimd. Specifically, fullusedblocks equals 64, representing that there are 64 blocks in the input data. At lines 5-6, two float * variables, tempRealFloatPtr and tempImagFloatPtr, are declared. These two variables serve as working pointers for the function. At line 7, an outer FOR loop is defined to loop through all images: for (int k=0; k<z; k++). At line 10, a first inner FOR loop is defined to loop through each block of the input data: for (int k=0; k<z; k++). At line 12, a second inner FOR loop is defined to loop numsimd times (i.e., the number of rows of data in each block): for (int j=0; j<numsimd; j++). At line 13, a third inner FOR loop is defined to loop through cols times in numsimd increments: for (int i=j; i<numsimd* cols; i=i+numsimd). Taken together, the outer FOR loop and the three inner FOR loops read the next sequential input data and steps through the output variables carefully in order to store input into a proper location in the output variables.

At line 14, an fread function is invoked to read a single floating point value from input data file fp_data into an output location tempRealFloatPtr[i]. Similarly, at line 15, the fread function is again invoked to read a single floating point value from input data file fp_data into an output location tempImagFloatPtr[i]. Taken together, lines 14 and 15 read the next sequential complex number from the input data and store the real and imaginary parts of the complex number respectively into the proper locations of the output variables.

At lines 22-24, the output pointers tempRealFloatPtr and tempImagFloatPtr are adjusted to point to the next block of the input data. Specifically, each output pointer is advanced by (numsimd* cols) elements. Finally, at line 27, the function convertfromC2SIMD returns.

Below is a sample pseudo-code for performing the conversion from the new SIMD multi-row data format back to the row-major format corresponding to the backward conversion in step 640 of FIG. 6, according to one embodiment of the invention. In this example, the formats of the input and output for this function are reversed. That is, the input data is in SIMD format (instead of row-major order as in the previous example), and the output data is in row-major order (instead of SIMD form a as in the previous example). dataReal and dataImag point to the real and imaginary input data in SIMD format. outputfile is a file pointer to an output data file in row-major order.

TABLE VII

Converting from SIMD format back to row-major order - C++ source code

```
1  int convertfromSIMD2C(float* dataReal, float * dataImag,
2      int cols, int rows, int z, FILE * outputfile) {
3  int numsimd = 4; // e.g. 128 bit register @ 4 byte single precision floating point
4  int fullusedblocks = rows / numsimd; // e.g. 256/4 = 64 blocks (1 block = 4 rows)
5  int totalblocks = z * fullusedblocks; // total no. of blocks
6  // Loop through all blocks in the data, spanning multiple images
7  for (int k = 0; k < totalblocks; k++) {
8      float * tempRealFloatPtr = &(dataReal[(k)*256*4]);  //position to start of a block
9      float * tempImagFloatPtr = &(dataImag[(k)*256*4]); //position to start of a block
10     // Extract numsimd rows from each block
11     // Blocks have numsimd rows packed together
12     // The data must be unpacked in the output file
13     for (int j = 0; j < numsimd; j++) {
14         for (int i = j; i < numsimd * cols; i = i + numsimd) {
15             fwrite(&(tempRealFloatPtr[i]), sizeof(float), 1, outputfile);
16             fwrite(&(tempImagFloatPtr[i]), sizeof(float), 1, outputfile);
17         } // end i
18     } // end numsimd
19 } // end for totalblocks
```

TABLE VII-continued

Converting from SIMD format back to row-major order - C++ source code 20  return 0;
21 } // end convertfromSIMDtoC function At line 1, a function convertfromSIMD2C is defined. The function definition includes formal parameters dataReal and dataImag of type float * which represent input pointers for real and imaginary parts of complex numbers, respectively. At line 2, the function definition includes the following additional formal parameters: cols of type int representing the number of columns of the input data, rows of type int representing the number of rows of the input data, and z of type int representing the number of images to convert. The function definition also includes a formal parameter outputfile of type FILE *, which represents an output file in SIMD format. At line 3, an int numsimd is defined to be 4, meaning that four rows of data of have been processed simultaneously by SIMD operations following an earlier conversion to SIMD format. Put another way, there are four consecutive rows of data in each block of the data in SIMD format.

At line 4, an int fullusedblocks is defined to be rows/ numsimd. Specifically, fullusedblocks equals 64, representing that there are 64 blocks in the input data. At line 5, an int totalblocks is defined to be z * fullusedblocks. Specifically, totalblocks represents the total number of blocks across all images. At line 7, an outer FOR loop is defined to loop through all blocks of the input data: for (int k=0; k<totalblocks; k++).

At lines 8-9, two float * variables, tempRealFloatPtr and tempImagFloatPtr, are declared. These two variables serve as working pointers for the function. Specifically, the input pointers tempRealFloatPtr and tempImagFloatPtr are adjusted to point to the start of the block of the input data: tempRealFloatPtr=&(dataReal[(k)*256*4]) and tempImagFloatPtr=&(dataImag[(k)*256*4]).

At line 13, a first inner FOR loop is defined to loop numsimd times (i.e., the number of rows of data in each block): for (int j=0; j<numsimd; j++). At line 14, a second inner FOR loop is defined to loop through cols times in numsimd increments: for (int i=j; i<numsimd* cols; i=i+numsimd). Taken together, the outer FOR loop and the two inner FOR loops read the next sequential input data and steps through the output variables carefully in order to store input into a proper location in the output variables. Put another way, the FOR loops extract numsimd rows from each block and unweaves the interleaved row elements in each block.

At line 15, an fwrite function is invoked to write a single floating point value from input location tempRealFloatPtr[i] to an output data file outputfile. Similarly, at line 16, the fwrite function is again invoked to write a single floating point value from input location tempImagFloatPtr[i] to an output data file outputfile. Taken together, lines 15 and 16 read the next sequential complex number from the input data and store the real and imaginary parts of the complex number respectively into the proper locations of the output file. Finally, at line 27, the function convertfromSIMDtoC returns.

Of course, the embodiments described herein are intended to be illustrative and not limiting of the invention, and other embodiments are broadly contemplated. Those skilled in the art will recognize, for example, that while embodiments are described above using C++ like programming syntax, other programming languages, such as C and Java, may be supported by embodiments of the invention. Further, while embodiments are described above using two-dimensional arrays of integers, data types other than integers, such as floats, doubles, and complex numbers may be supported by embodiments of the invention. Further still, while embodiments are described above using m×n matrices where m=n (e.g., m=n=8), m×n matrices were m≠n (e.g., m=8, n=16) may be supported by embodiments of the invention. Still further, while embodiments are described above for SIMD operations that process four rows simultaneously (i.e., s=4; four rows to each block), SIMD operations that process other numbers of rows simultaneously (i.e., s=8, s=16, s=32, etc.) may be supported by embodiments of the invention. Moreover, while embodiments are described above using two-dimensional matrices, matrices of any number of dimensions d may be supported by embodiments of the invention. Still further, any algorithm that may benefit from working on multiple rows of data at a time may benefit from the SIMD convertor.

Advantageously, embodiments of the invention provide a technique for generating SIMD data structures. The SIMD data structures are tailored for simultaneous processing of s rows at a time. Specifically, each SIMD instruction may process one element from each of the s rows of the input data, for a total of s elements being processed in a single SIMD instruction. Once modified to work with the SIMD format, FFT algorithms may exploit row parallelism during computation for improved performance.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a single instruction, multiple data (SIMD) data structure tailored for processing fast Fourier transforms (FFTs) on a SIMD multi-core processor architecture, comprising:
   receiving input data, wherein the input data is a matrix having m rows and n columns;
   converting the input data into a SIMD format to produce converted data for simultaneous processing of s rows of the input data, wherein s is a power of two, wherein m and n are greater than and divisible by s, wherein the converted data includes a sequence of blocks, wherein each block includes s consecutive rows of the input data that are interleaved such that a set of each first element of the s consecutive rows immediately precedes a set of each second element of the s consecutive rows in terms of sequential memory addresses and such that the set of each second element of the s consecutive rows immediately precedes a set of each third element of the s consecutive rows in terms of sequential memory addresses, to produce s interleaved rows; and
   storing the converted data in sequential memory addresses, wherein a SIMD operation, comprising an FFT, is performed on the converted data.

2. The method of claim 1, further comprising:
   performing at least one SIMD operation, including the SIMD operation, on the converted data to compute a result, wherein the computed result includes a sequence of blocks, wherein each block includes s consecutive rows of data that are interleaved such that all of the first elements of the s consecutive rows precede any of the second elements of the s consecutive rows in terms of sequential memory addresses; and converting the computed result from the SIMD format by: unweaving the s interleaved rows of data in each block of the computed result, such that the first row of the computed result precedes the second row of the computed result in terms of sequential memory addresses.

3. The method of claim 1, wherein m equals n.

4. The method of claim 1, wherein s equals four.

5. The method of claim 1, wherein the input data is converted into SIMD format by an application, wherein the application is configured to independently convert the input data from each individual format selected from row-major order and column-major order, wherein the input data when in row-major order is arranged differently than the input data when in column-major order.

6. The method of claim 5, wherein the input data is converted into SIMD format from row-major order in a first instance, wherein the input data is converted into SIMD format from column-major order in a second instance to produce converted data for simultaneous processing of s columns of the input data in the second instance, wherein the converted data in the second instance includes a sequence of blocks, wherein each block includes s consecutive columns of the input data that are interleaved such that a set of each first element of the s consecutive columns immediately precedes a set of each second element of the s consecutive columns in terms of sequential memory addresses and such that the set of each second element of the s consecutive columns immediately precedes a set of each third element of the s consecutive columns in terms of sequential memory addresses, to produce s interleaved columns.

7. The method of claim 6, wherein the application is further configured to:

performing at least one SIMD operation on the converted data in the first instance to compute a result, wherein the computed result includes a sequence of blocks, wherein each block includes s consecutive rows of data that are interleaved such that all of the first elements of the s consecutive rows precede any of the second elements of the s consecutive rows in terms of sequential memory addresses; and converting the computed result from the SIMD format to row-major order by unweaving the s interleaved rows of data in each block of the computed result, such that a set of values in the computed result that corresponds to the first row of the received input data immediately precedes a set of values in the computed result that corresponds to the second row of the received input data in terms of sequential memory addresses and such the set of values in the computed result that corresponds to the second row of the received input data immediately precedes a set of values in the computed result that corresponds to the third row of the received input data in terms of sequential memory addresses.

8. The method of claim 7, wherein the application is further configured to:

performing at least one SIMD operation on the converted data in the second instance to compute a result, wherein the computed result in the second instance includes a sequence of blocks, wherein each block includes s consecutive columns of data that are interleaved such that all of the first elements of the s consecutive columns precede any of the second elements of the s consecutive columns in terms of sequential memory addresses; and converting the computed result in the second instance from the SIMD format to column-major order by unweaving the s interleaved columns of data in each block of the computed result, such that a set of values in the computed result that corresponds to the first column of the received input data in the second instance immediately precedes a set of values in the computed result that corresponds to the second column of the received input data in terms of sequential memory addresses and such the set of values in the computed result that corresponds to the second column of the received input data immediately precedes a set of values in the computed result that corresponds to the third column of the received input data in terms of sequential memory addresses.

9. The method of claim 8, wherein the application is further configured to independently convert the received input data in each of the first and second instances such that the set of each first element of the s consecutive rows immediately precedes the set of each second element of the s consecutive rows in terms of sequential memory addresses and such that the set of each second element of the s consecutive rows immediately precedes the set of each third element of the s consecutive rows in terms of sequential memory addresses, for each individual memory address orientation selected from increasing memory address order and decreasing memory address order.

10. A computer readable storage medium containing a program which, when executed, performs an operation for generating a single instruction, multiple data (SIMD) data structure tailored for processing fast Fourier transforms (FFTs) on a SIMD multi-core processor architecture, comprising:

receiving input data, wherein the input data is a matrix having m rows and n columns;

converting the input data into a SIMD format by operation of one or more computer processors when executing the program, to produce converted data for simultaneous processing of s rows of the input data, wherein s is a power of two, wherein m and n are greater than and divisible by s, wherein the converted data includes a sequence of blocks, wherein each block includes s consecutive rows of the input data that are interleaved such that a set of each first element of the s consecutive rows immediately precedes a set of each second element of the s consecutive rows in terms of sequential memory addresses and such that the set of each second element of the s consecutive rows immediately precedes a set of each third element of the s consecutive rows in terms of sequential memory addresses, to produce s interleaved rows; and storing the converted data in sequential memory addresses, wherein a SIMD operation, comprising an FFT, is performed on the converted data.

11. The computer readable storage medium of claim 10, wherein the program further comprises:

performing at least one SIMD operation, including the SIMD operation, on the converted data to compute a result, wherein the computed result includes a sequence of blocks, wherein each block includes s consecutive rows of data that are interleaved such that all of the first elements of the s consecutive rows precede any of the second elements of the s consecutive rows in terms of sequential memory addresses; and converting the computed result from the SIMD format by: unweaving the s interleaved rows of data in each block of the computed result, such that the first row of the computed result precedes the second row of the computed result in terms of sequential memory addresses.

12. The computer readable storage medium of claim 10, wherein m equals n.

13. The computer readable storage medium of claim 10, wherein s equals four.

14. A system, comprising:
- a processor; and
- a memory containing a program, which when executed by the processor is configured to perform an operation for generating a single instruction, multiple data (SIMD) data structure tailored for processing fast Fourier transforms (FFTs) on a SIMD multi-core processor architecture, comprising:
  - receiving input data, wherein the input data is a matrix having m rows and n columns;
  - converting the input data into a SIMD format to produce converted data for simultaneous processing of s rows of the input data, wherein s is a power of two, wherein m and n are greater than and divisible by s, wherein the converted data includes a sequence of blocks, wherein each block includes s consecutive rows of the input data that are interleaved such that a set of each first element of the s consecutive rows immediately precedes a set of each second element of the s consecutive rows in terms of sequential memory addresses and such that the set of each second element of the s consecutive rows immediately precedes a set of each third element of the s consecutive rows in terms of sequential memory addresses, to produce s interleaved rows; and
  - storing the converted data in sequential memory addresses, wherein a SIMD operation, comprising an FFT, is performed on the converted data.

15. The system of claim 14, wherein the program further comprises:
- performing at least one SIMD operation, including the SIMD operation, on the converted data to compute a result, wherein the computed result includes a sequence of blocks, wherein each block includes s consecutive rows of data that are interleaved such that all of the first elements of the s consecutive rows precede any of the second elements of the s consecutive rows in terms of sequential memory addresses; and
- converting the computed result from the SIMD format by:
  - unweaving the s interleaved rows of data in each block of the computed result, such that the first row of the computed result precedes the second row of the computed result in terms of sequential memory addresses.

16. The system of claim 14, wherein m equals n.

17. The system of claim 14, wherein s equals four.

18. A computer-implemented method for generating a single instruction, multiple data (SIMD) data structure tailored for processing fast Fourier transforms (FFTs) on a SIMD multi-core processor architecture, comprising:
- receiving input data, wherein the input data is a matrix having m rows and n columns, wherein the matrix includes b blocks, and wherein each block includes s consecutive rows, wherein s is a power of two, wherein m and n are greater than and divisible by s; and
- copying the b blocks into sequential memory addresses to generate the SIMD data structure, wherein a SIMD operation, comprising an FFT, is performed on the generated SIMD data structure, wherein copying a block comprises:
- copying, into sequential memory addresses, each first element of the s consecutive rows of the block, immediately followed by each second element of the s consecutive rows of the block, immediately followed by each third element of the s consecutive rows of the block, followed by remaining elements of the s consecutive rows in a similar manner, ending with last elements of the s consecutive rows of the block.

19. The method of claim 18, further comprising:
- performing at least one SIMD operation, including the SIMD operation, on the converted data to compute a result;
- storing the result as b result blocks in sequential memory addresses, wherein each result block includes s consecutive rows; and
- copying the b result blocks from sequential memory addresses into a result matrix having m rows and n columns, wherein the result matrix includes b blocks, and wherein each block includes s consecutive rows, and wherein copying a result block comprises:
- copying values of the result block from sequential memory addresses into first elements of the s consecutive rows of the block in the result matrix, then into second elements of the s consecutive rows of the block in the result matrix, then into remaining elements of the s consecutive rows in a similar manner, and finally into last elements of the s consecutive rows of the block in the result matrix.

* * * * *